United States Patent
Biswas et al.

(10) Patent No.: US 7,853,054 B2
(45) Date of Patent: *Dec. 14, 2010

(54) FINGERPRINT TEMPLATE GENERATION, VERIFICATION AND IDENTIFICATION SYSTEM

(75) Inventors: Sanjeev Kumar Biswas, Bangalore (IN); Narayan Nambudiri, Kings Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1109 days.

This patent is subject to a terminal disclaimer.

(21) Appl. No.: 11/461,490

(22) Filed: Aug. 1, 2006

(65) Prior Publication Data

US 2010/0239132 A1    Sep. 23, 2010

Related U.S. Application Data (63) Continuation of application No. 10/260,447, filed on Sep. 27, 2002, now Pat. No. 7,120,280.

(51) Int. Cl.
*G06K 9/00* (2006.01)
(52) U.S. Cl. .................... 382/124; 382/115; 382/116
(58) Field of Classification Search ............... 382/124, 382/126, 127, 313, 314, 315; 340/5.52, 5.53, 340/5.82, 5.83, 356; 358/496, 497, 486; 234/234
See application file for complete search history.

(56) References Cited

U.S. PATENT DOCUMENTS

| | | | |
|---|---|---|---|
| 4,618,988 A | 10/1986 | Schiller | |
| 5,493,621 A | 2/1996 | Matsumura | |
| 6,876,757 B2 | 4/2005 | Yau et al. | |
| 6,961,453 B2 | 11/2005 | Yoon et al. | |
| 7,120,280 B2 | 10/2006 | Biswas et al. | |
| 2002/0146178 A1 | 10/2002 | Bolle et al. | |
| 2003/0039382 A1 | 2/2003 | Yau et al. | |

OTHER PUBLICATIONS

U.S. Office Action dated Dec. 28, 2005 related to parent application U.S. Patent No. 7120280 issued Oct. 10, 2006.

U.S. Notice of Allowance dated Jun. 7, 2006 related to parent application U.S. Patent No. 7120280 issued Oct. 10, 2006.

*Primary Examiner*—Brian Q Le (57) ABSTRACT

A system to generate a template of a fingerprint input image is described. The system provides for smoothing the input image, forming a binary image from it, and further processing the binary image to extract the minutia of the fingerprint. The minutiae are stored in the template, in the form of locations of each minutia in relation to all other minutiae. The system includes optional identification and verification steps, which compare the template generated according to the system with templates stored in a fingerprint database.

20 Claims, 7 Drawing Sheets

FINGERPRINT TEMPLATE GENERATION, VERIFICATION AND IDENTIFICATION SYSTEM

CROSS REFERENCE TO RELATED APPLICATIONS

This application is a continuation of U.S. patent application Ser. No. 10/260,447 filed on Sep. 27, 2002, entitled "FINGERPRINT TEMPLATE GENERATION, VERIFICATION AND IDENTIFICATION SYSTEM", which is incorporated herein by reference.

FIELD OF THE INVENTION

The present invention relates to methods and systems of identification fingerprint biometrics.

BACKGROUND OF THE INVENTION

Since the early days of society there has been a significant need to positively identify persons, to grant or deny them access to places, information, property etc. With the advent of modern technologies, the ability of even a single person to collect information, cause damage or affect events has increased exponentially, making it more important than ever to positively ensure that someone really is who he or she claims to be. Additionally, it is also important to identify unknown persons, for example to determine whether they may be of interest to security or law enforcement organizations.

The importance and value of identification systems cannot be overstate. In addition to addressing the better known national security issues such as espionage, sabotage etc, more recent concerns over terrorism and industrial espionage have demanded fast and accurate methods of identification, which cannot easily be defeated by a determined opponent. These methods are useful not only to secure access to physical locations, such as military, governmental and industrial sites, but also to limit access to information stored in electronic devices such as computers, which may be connected to worldwide networks.

Identification cards and access codes have been used to identify persons and to grant access, but they have severe limitations. Cards can be lost, stolen or forged, and codes/passwords can be forgotten or obtained by the wrong persons. Biometrics provides a solution to these issues. Biometrics is the statistical observation and measurement of biological phenomena, such as the characteristics that differentiate one person from another. These biometric characteristics are used to identify and validate someone's identity. Perhaps the oldest form of biometric identification involves comparing fingerprints of a person to known fingerprints. This method can be very accurate, but is often time consuming if done manually, and resource intensive if carried out by machine. In addition, imperfect fingerprints due to contamination or injury of the fingers or to a partial fingerprint make the comparison problem even more difficult.

SUMMARY OF THE INVENTION

In one aspect, embodiments of the present invention include a method for fingerprint recognition, which includes providing a machine readable input fingerprint image, smoothing the input fingerprint image to remove noise, binarizing the smoothed input fingerprint image to form a binary image, processing the binary image to identify minutiae of the fingerprint image, and generating a template describing the minutiae.

In a different aspect, the present invention is a system for analyzing fingerprints. The system includes a software module configured to receive an input fingerprint image, the input fingerprint image having dark portions representing fingerprint ridges and light portions representing fingerprint furrows, the software module further configured to generate a binary image from the input fingerprint image, and to extract a set of minutiae from the binary image. The system also includes a memory module configured to store a template of location information of the set of minutiae.

DETAILED DESCRIPTION

The present invention may be further understood with reference to the following description and the appended drawings, wherein like elements are referred to with the same reference numerals. Biometric techniques may be used to identify persons by comparing their biometric characteristics to a database of biometric characteristics of known individuals, and finding a matching entry. The same techniques may be used to verify a person's identity, by comparing their biometric characteristics to those of the person they purport to be. Fingerprint based biometric identification is one of the oldest methods which has been used successfully in various applications. It is well known that every person has unique, immutable fingerprints, which may be used to distinguish them from other persons. Fingerprints may be compared visually by trained personnel, but for large scale and rapid operations the use of machine comparison is necessary.

Fingerprints are made of a series of ridges and furrows or valleys formed on the surface of the finger's skin. Each fingerprint is unique, as determined by the pattern of ridges and furrows, which form the elevated and depressed portions of the fingertips, respectively. In particular, the intersections of multiple ridges are of interest, and are called the minutiae of the fingerprint. Minutiae points are characteristics of the pattern of ridges, which identify a ridge bifurcation or a ridge ending. The pattern of minutiae may also be used to identify the fingerprint. Although this method does not take into account the global shape of the ridges and the furrows of the fingerprint, it is generally considered sufficiently accurate to identify the person to whom the fingerprint belongs. Comparing minutiae rather than the entire fingerprint makes the process faster and less resource intensive.

Figure 1:
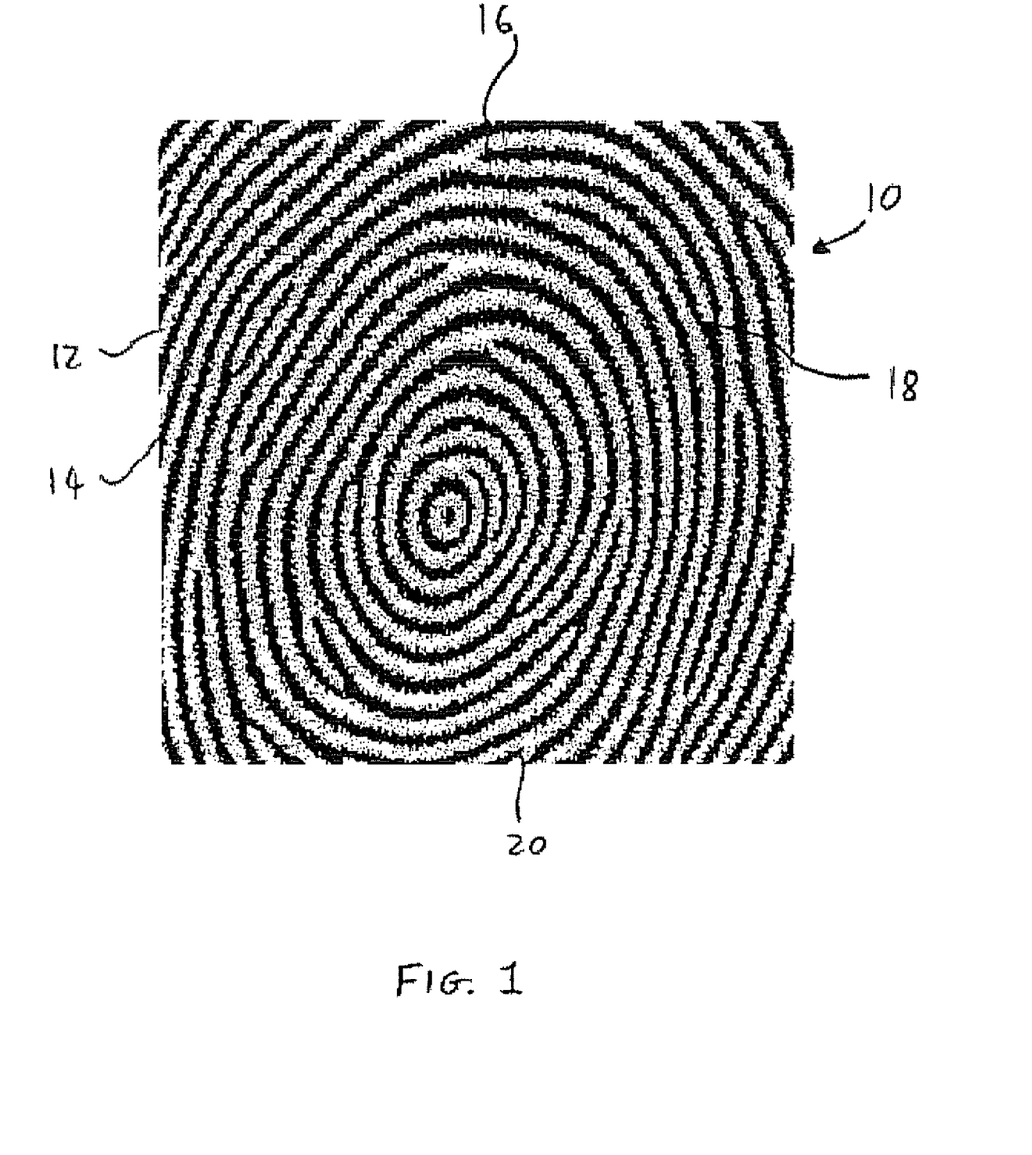
FIG. 1 is a drawing showing a typical input fingerprint image used according to embodiments of the present invention.

Before analyzing the minutiae, it should be determined whether to follow the pattern of ridges or of furrows of the fingerprint. Both will generally follow the same outline, but for simplicity either the ridges or the furrows should be mapped, and not both. In the present example, ridges may be followed to determine the location of minutiae. FIG. 1 shows a typical fingerprint 10, as would be obtained from a conventional inked fingerprint card, or from an electronic scanner. In this representation, the ridges appear as dark lines 14, and the furrows as light lines 12. This mimics the results obtained using inked fingerprint cards, where the finger is coated with ink, and is pressed against the card. The raised ridges deposit ink on the card, while the furrows do not. In the case of an electronic scanner, for example one using charge coupled devices to detect light, different representations may be selected, without affecting the validity of the present invention. The scanner's electronic sensors detect the different reflectivity of ridges and furrows, and may assign a different color to each, for example black and white.

If the input fingerprint image that is to be analyzed is an analog drawing or representation, the first step that should be carried out is to convert the image to a format that is machine readable. For example, the image may be digitized with a conventional scanner, such that each pixel of the image is described in terms of a numerical code. This step may be carried out in any conventional manner which results in a digital graphic file that may be read and used, for example, by an electronic processor. This step will generally be necessary if the input fingerprint image is formed by ink on paper, such as the well known fingerprint cards.

Once the fingerprint image is in a condition that can be manipulated by machine, for example after the digital image has been generated, a smoothing operation may be carried out. This operation remove noise from the input image signal, so that a more accurate and efficient processing can take place subsequently. It is important that the image be devoid of noise as much as practical, to minimize errors in determining the minutiae of the fingerprint. Noise may be due, for example, to dirt or injuries to the fingers when the fingerprint is taken, or simply to poor quality of the fingerprint input image. For example, algorithms may be used to evaluate the shapes present in the input fingerprint image, and eliminate pixels that do not conform to known fingerprint patterns. Those of skill in the art will understand that other conventional image smoothing processes may be utilized for this purpose, while remaining within the scope of the present invention.

After the initial smoothing operation is carried out, a binarization step may take place. This operation involves representing the fingerprint as a binary image, consisting of an array of 0 and 1 digits. For example, every pixel of the fingerprint image that depicts a black point, corresponding to a ridge, may be represented by a digit 1. Conversely, every white pixel corresponding to a furrow may be represented by a digit 0. This representation is necessary to allow an electronic process to manipulate the image, and eventually extract the minutiae 20 such as ridge termination 16 and ridge bifurcation 18 shown in FIG. 1. In some cases, the input fingerprint image 10 may contain pixels that are of a color that is not clearly black or white, but rather of a tone of gray. This eventuality may be resolved by specifying a threshold value or value range of the pixels, below which a pixel value of 0 is assigned, and above which a pixel value of 1 is assigned. The threshold value may be a level of gray of the pixel, or a level of whichever property is used to distinguish between furrows and ridges.

The binary image at this point contains lines that correspond, for example, to the fingerprint ridges 14 shown in FIG. 1. However, these lines may have different thicknesses, due to different thicknesses of the ridges on the person's finger, or simply to distortion occurring when obtaining and manipulating the input fingerprint image 10. A thinning operation may be carried out to remedy this problem, since lines of uneven thickness make the determination of minutiae more difficult. Thinning consists of normalizing all the lines describing the ridges and furrows of the fingerprint, so that every line has a width of one pixel. In other words, lines that start with a thickness of more than one pixel, or that have sections with a varying width, after thinning will have a uniform width of one pixel. Conventional algorithms may be used to perform this function. For example, the centerline of each line may be numerically computed, and the line may be re-drawn along that centerline, with the desired width of one pixel.

Figure 2:
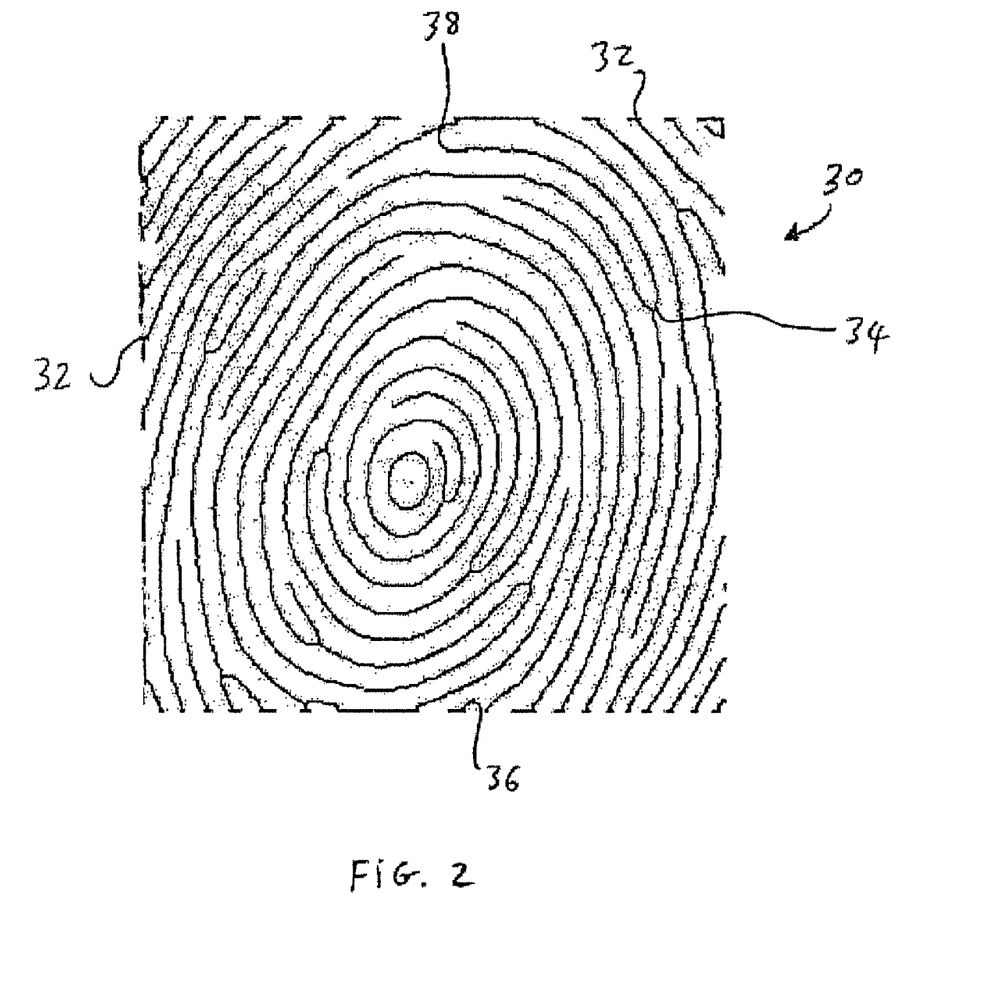
FIG. 2 is a schematic diagram showing the input fingerprint image of FIG. 1 after binarizing and thinning operations, according to an embodiment of the present invention.

FIG. 2 shows the result of thinning on the image of FIG. 1. The same pattern of ridges and furrows is retained in thinned image 30 as it was in the input fingerprint image 10 of FIG. 1, but now lines 32 representing the are all of the same width, in this case one pixel. Minutiae 36 are the same as before the operation, for example with ridge end 38 and ridge bifurcation 34 remaining in the same location. The thinning or normalization process thus results in a thinned fingerprint image 30 where every line has the same one pixel width along its entire length. All the characteristics of the input fingerprint image are retained, including the location and number of minutiae, and the global shape of the ridges and furrows. As will be described below, thinning the image considerably simplifies the process of isolating minutiae from the image.

As indicated above, minutiae may be defined by the ends and the bifurcations of lines representing the ridges of the fingerprint. Accordingly, one way to determine the location of a minutia is to look for points that are not within a single line segment, but rather are at the end of a segment or at the intersection of multiple segments. Points that are part of a single line will have only one line segment behind them and only one line segment in front. Termination points 16 will have only one segment behind them, with no segments in front. Bifurcation points 18 will have more than two line segments ahead and/or behind them, as shown in FIG. 1. To simplify the recognition of minutiae, the scheme may be simplified by only considering bifurcation minutiae to represent the fingerprint. This simplification may reduce somewhat the accuracy of the fingerprint representation, but not enough to reduce significantly the validity of the method. In return, the simpler representation may be much faster and more efficient than using all minutiae in representing the fingerprint.

Figure 3:
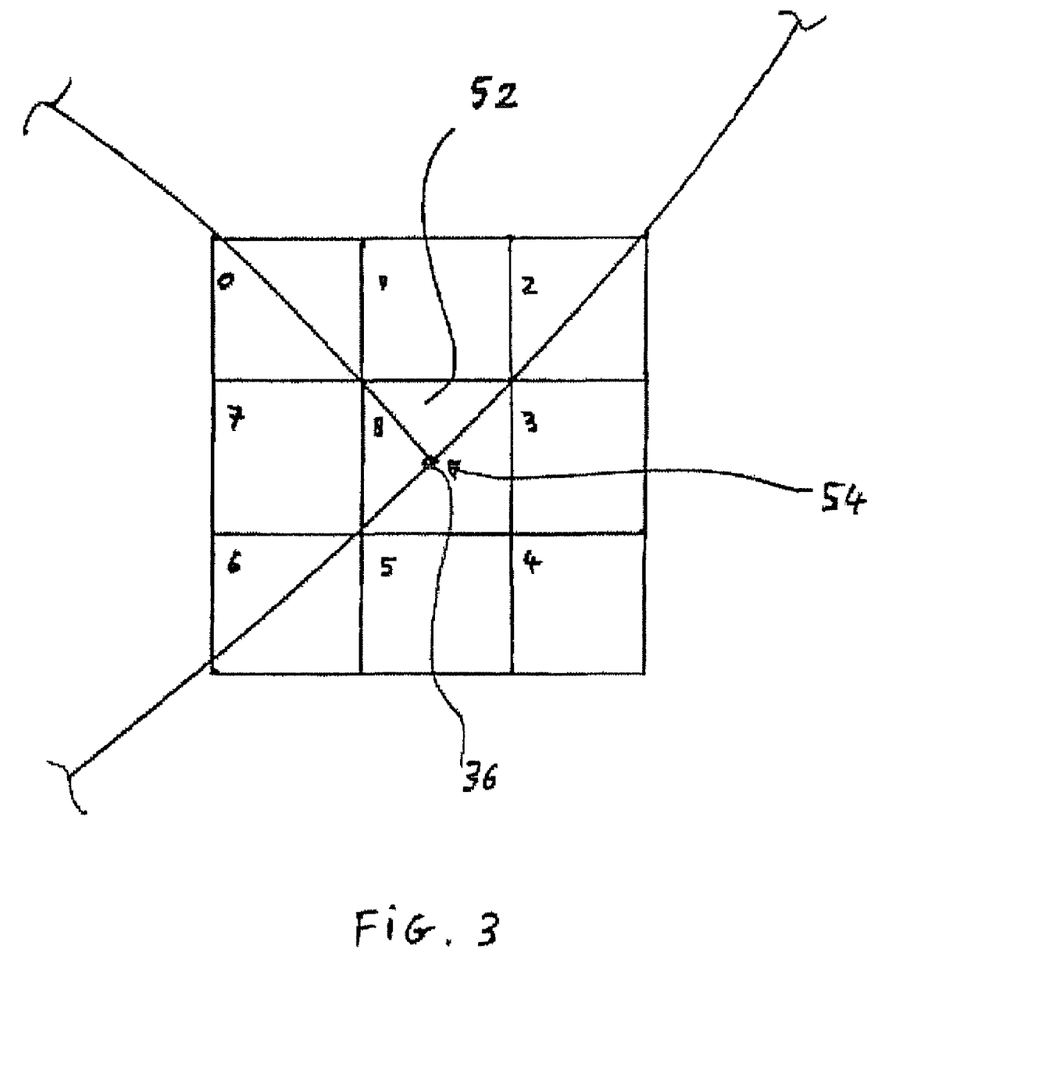
FIG. 3 is a schematic drawing of a grid encompassing neighboring pixels used to determine the location of minutiae according to an embodiment of the invention.

Since the thickness of the ridge lines has been normalized to equal one pixel in the thinning process, a simple method may be used to determine the location of bifurcation minutiae. Every pixel representing a point along the length of a ridge line of the thinned fingerprint image is analyzed. As shown in FIG. 3, a grid 50 is constructed around the pixel, which is centered at cell 52 of grid 50. Each cell is approximately the size of a pixel, and thus may only contain one pixel. In this example, a pixel 54 of thinned line 32 is centered at cell 52. (The actual width of line 32 is not shown in the drawing.) The cells of grid 50 are numbered 0-8, and each corresponds to pixel 54 and to one of the eight neighboring pixels of pixel 54. As we move from one cell to the next, every time that a change from 0 to 1 is seen in the pixel value of the pixels, the value of a transition sum summation counter is increased by one, starting from a zero value. This is done to determine whether pixel 54 represents a bifurcation, thus a minutia. The pixel values of each pixel have been set in the binarization step, as described above, and are 0 for white pixels that do not represent points on the fingerprint ridge lines, and 1 for black pixels that represent points on the ridge lines.

Since each cell 0-7 contains one pixel only with a pixel value of 1 or 0, the transition sum computed by noting changes of the neighboring pixel values indicates the type of point found in cell 52. If the transition sum is equal to at least 3, it means that at least three neighboring points of pixel 54 have a value of 1, indicating that a bifurcation exists at point 54. A termination may be indicated when the transition sum equals to one. Generation of the transition sum may be referred to as the Zero-One Sequence count, in reference to the pixel values being observed. In case the fingerprint ridge line divides into more than two branches, the transition sum will have a correspondingly higher value. In this exemplary embodiment, the transition sum indicating the number of transitions from 0 to 1 pixel value is carried out by moving through the cells in the order of cells 1, 2, 3, 4, 5, 6, 7 and 0. However, the same result may be reached by moving through the cells in a different order. In the example shown in FIG. 3, pixel 54 corresponds to a bifurcation point 36, and the corresponding transition sum equals to at least three, such that the presence of a minutia would be noted at cell 52. The existence of a minutia may thus be determined by computing the transition sum for all pixels depicting fingerprint features, and comparing each transition sum to a selected value (for example three) that acts as a threshold.

Figure 6A:
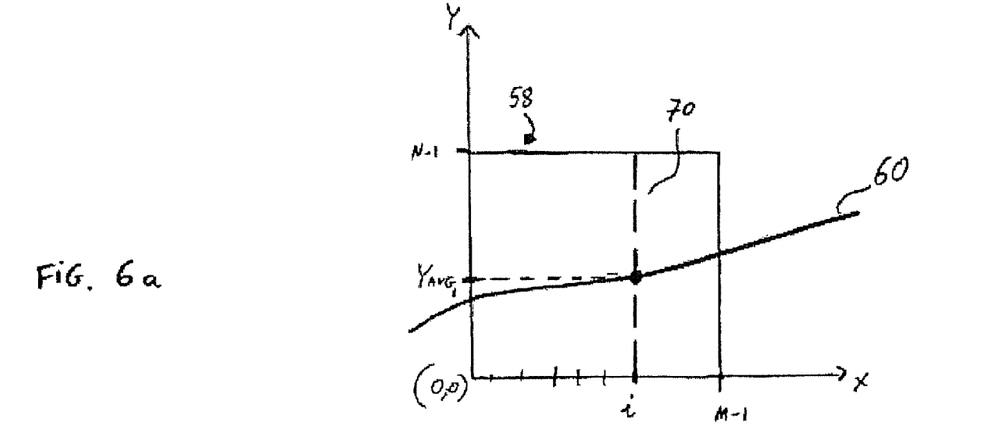
FIGS. 6a, 6b and 6c are diagrams showing a mask superimposed on fingerprint features, according to another embodiment of the invention.
Figure 6B:
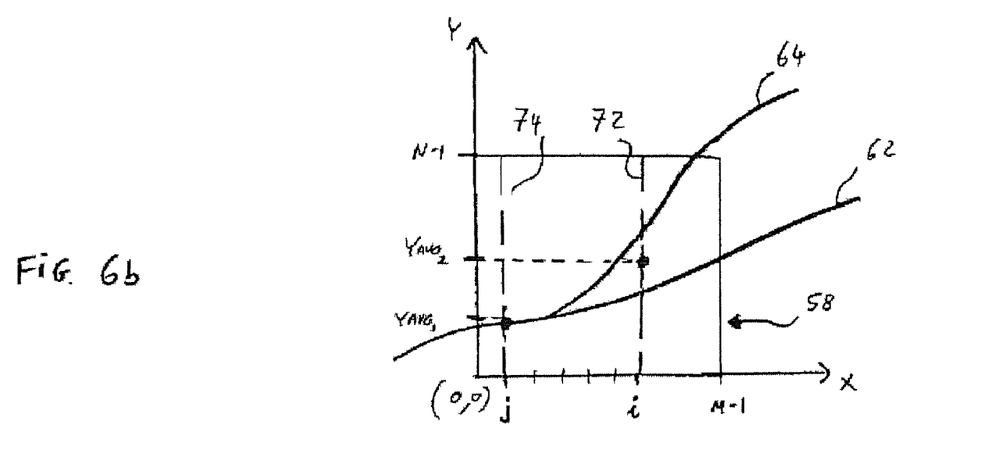
Figure 6C:
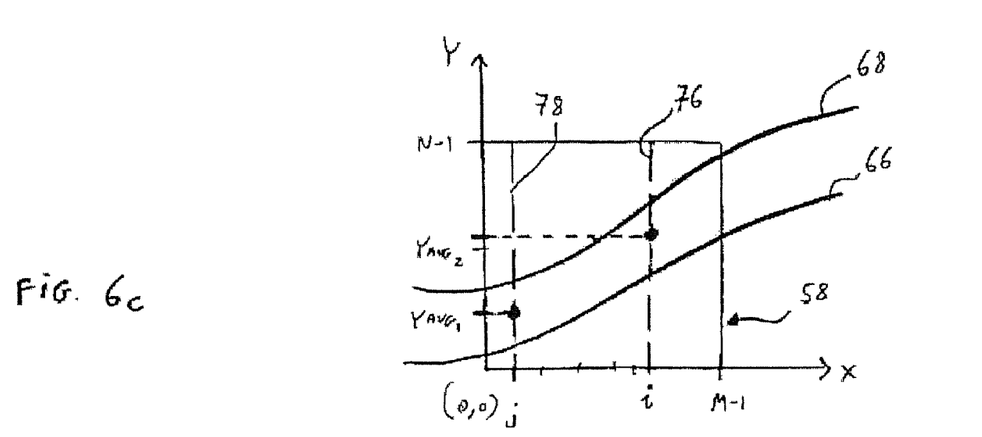

Other methods for computing the location of minutiae may be used according to embodiments of the invention. For example, a masking and Y-sequence method may be utilized, as shown in FIGS. 6a, 6b and 6c. According to this method, a first step comprises superimposing a mask 58 of M by N dimensions over successive segments of the fingerprint features. In this example, the features may be ridges to which have been assigned black pixels. An x-y coordinate system with origin (0,0) at the bottom left corner of the mask 58 is also included. Within the mask, moving on a path along the x-axis from (0,0) to (M−1,0), vertical lines are extended from points on the path to a height on the y-axis of N−1. These may be drawn at M equidistant points. For example, at a location x=i, the vertical line would extend from (i, 0) to (i, N−1). Along each of the vertical lines a $Y_{avg}$ value is computed according to the formula:

$$Y_{avg} = \left( \sum_{i=0}^{-1} Y_i \right) / N$$

In the formula, only the $Y_i$ values corresponding to a black pixel are summed, over the length of the vertical line from y=0 to y=N−1. Since each mask 58 has M vertical lines, the process generates M values of $Y_{avg}$ listed in sequential order, which are referred to as the Ys sequence.

The pattern of numbers in the Ys sequence may be used to determine if a bifurcation, thus a minutia, is present along the segment within the mask. In essence, the $Y_{avg}$ elements of the Ys sequence represent the average value of the y coordinate of all black pixels along a vertical line. In the example of FIG. 6a, a single line without bifurcations 60 exists in the mask region, and the Ys elements will be in increasing order if the segment is curved up, and in decreasing order if the segment is curved down. Since only one line segment exists at those points, all the $Y_{avg}$ values will map to black areas, as shown by line 70. If a genuine bifurcation point exists within the mask, as shown in FIG. 6b, the $Y_{avg}$ values will be either in decreasing or increasing order, but will map to a white area for points along the x-axis where more than one line segment 62, 64 exists (i.e on line 72), and will map to black areas where only one segment 62 exists (i.e. on line 74). In the case shown in FIG. 6c two parallel lines 66, 68 exist within mask 58. Here, all the $Y_{avg}$ values map in the white areas (on lines 76, 78), since the average y-coordinate of the black pixels never falls on either line segment.

The masking and Y-sequence method thus offers an exemplary alternative to determining the location of minutiae. This method may be carried out with or without a prior thinning step, since the averaging procedure does not require line segments that are one pixel wide, but can process segments of varying width. Although vertical lines were used in this example, lines in other orientations may also be used according to this method. The dimensions of the mask is important, and should be selected considering the size of the fingerprint features to be analyzed. The specific method used to isolate the minutiae may be selected depending on the application, based on required speed, accuracy and on the available computing resources. Those of skill in the art will understand that additional variations of these methods may be employed, without exceeding the scope of the present invention.

Figure 4A:
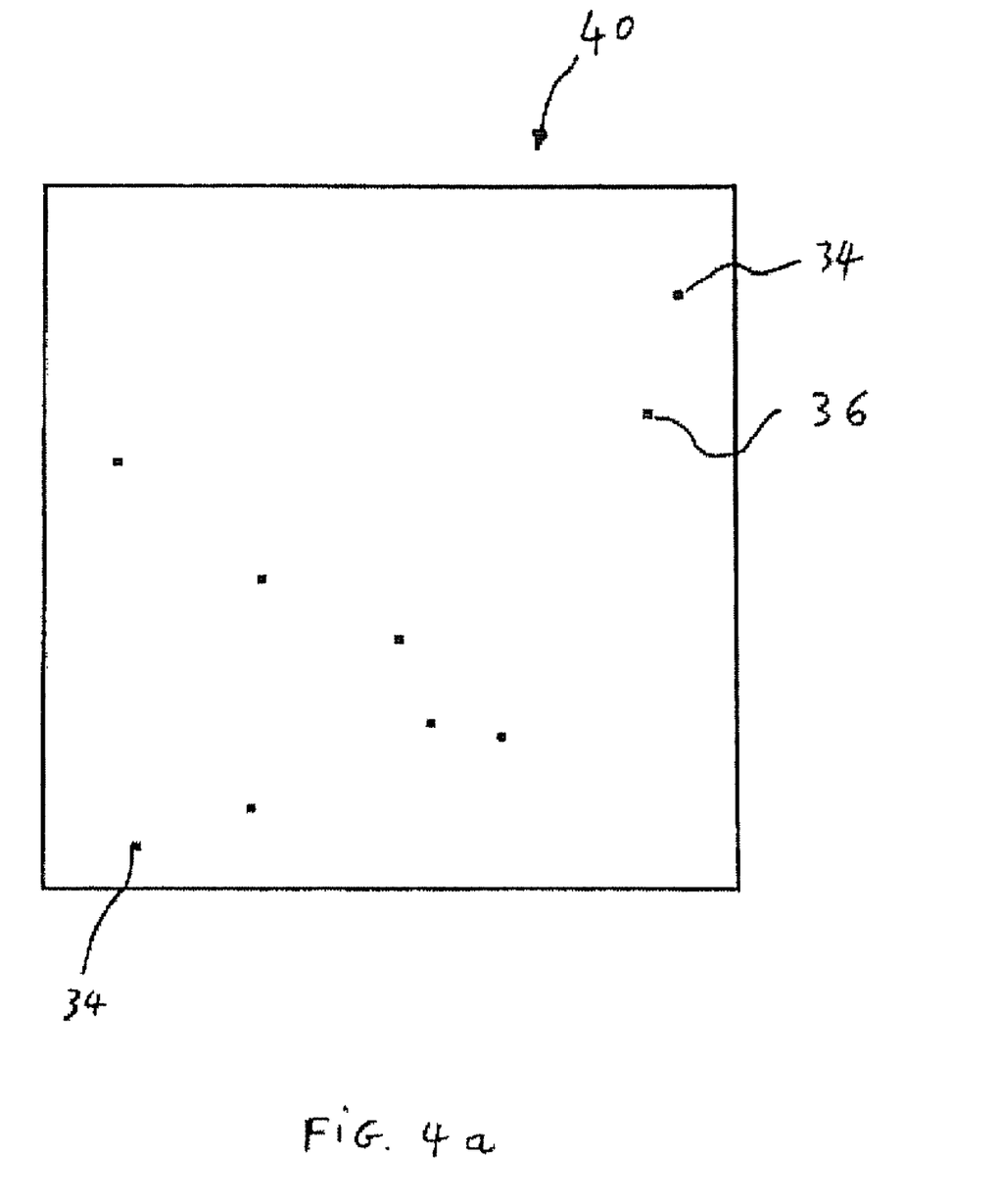
FIGS. 4a and 4b are schematic diagrams showing the minutiae derived from the fingerprint of FIG. 1, according to different embodiments of the present invention.
Figure 4B:
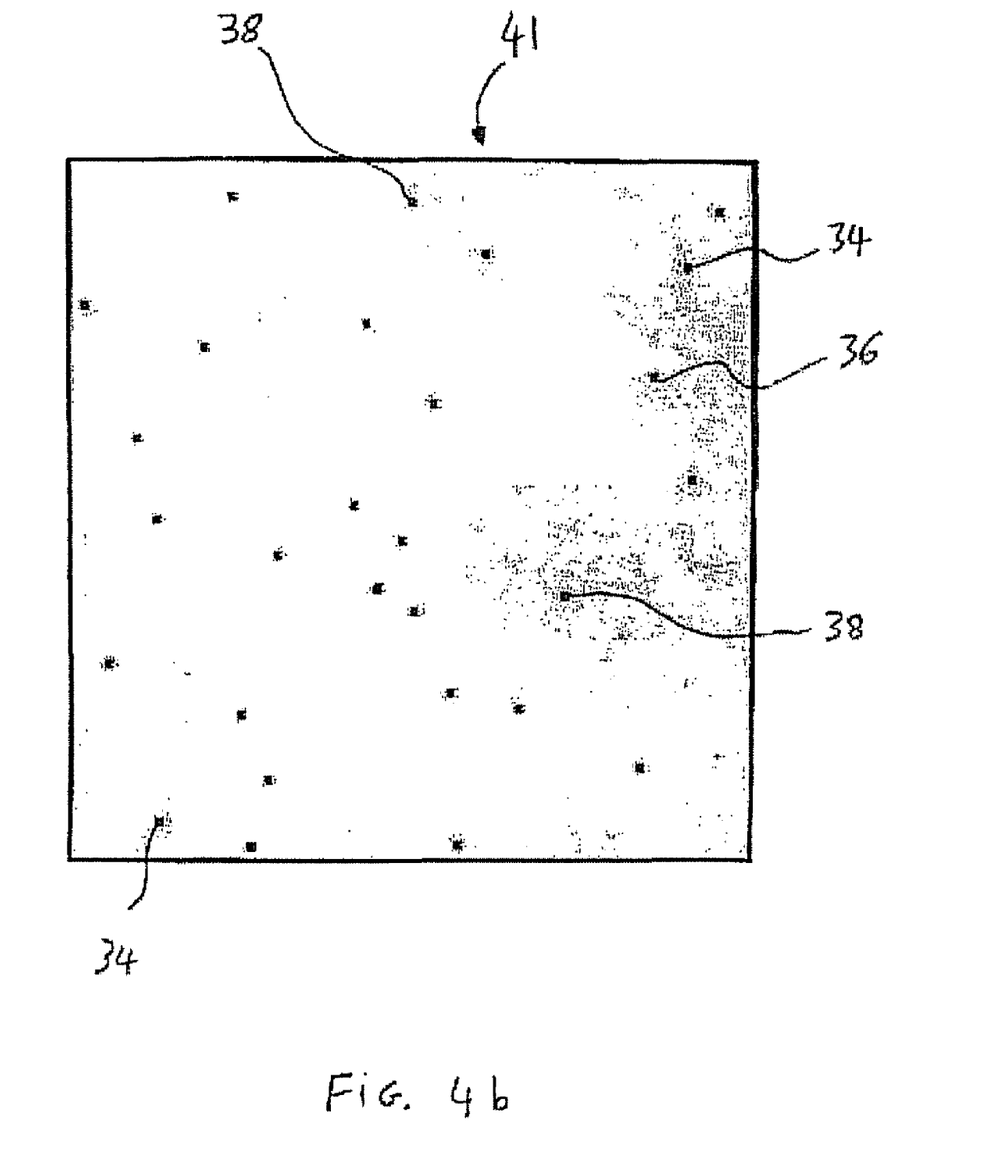

After evaluating all the pixels corresponding to fingerprint ridge lines in thinned fingerprint image 30, all the minutia representing bifurcation points can be mapped. FIG. 4a shows an example of such mapping 40, where fingerprint ridge lines 32 have been removed, and only minutiae 36 are shown. In this exemplary embodiment, only minutiae corresponding to bifurcations 34 are shown. FIG. 4b shows a different embodiment according to the invention, in which minutiae 36 correspond to both bifurcations 34 and terminations 38. At this point a fingerprint template may be constructed, which essentially provides a short hand description of the entire fingerprint which can be rapidly manipulated, for example, by an electronic processor. In one exemplary embodiment according to the present invention, the template may be constructed by describing, for each minutia point, position information of that minutia point. In one example, the position information of the template may include the distance of every minutia point from all other minutiae points.

In addition to the position information, gradient information may also be included in the template, to further create a unique representation of the fingerprint. The gradient information is not necessary to define a template, but may be useful in certain applications. Gradient information gives the slope of the line segments extending from the minutia being described, thus indicating if those segments extend upward, downward or horizontally from the minutia. In the case of a minutia defined by a branching, there will be at least three slope values describing the three segments extending from the branching. The template may be stored in a database for further manipulation, as described below, and its specific format may be tailored to the type of matching to be performed with it. In one example, the template may be a two-dimensional matrix with rows representing different minutiae, and columns within a row representing the distance from that minutia to each of the other minutiae. The distances from other minutiae may be listed in ascending order.

The template generated as described above may be used for two principal purposes. In one case, the template of an individual claiming to be a certain person may be used to validate the identity of that individual. In this process, a fingerprint of the individual is analyzed to generate a corresponding template. The template is then compared to a previously stored template generated from the person the individual claims to be. If the templates match, the individual is likely the person he claims to be, otherwise further investigation is necessary. In a second case, the template of an unknown individual may be used for identification of the individual. In this case, the template generated from the individual's fingerprints is compared to all the templates stored, for example, in a database of fingerprints belonging to known persons. When a match is found, the unknown individual is identified.

In many cases, the match between the template generated from the fingerprints to be verified or identified and the templates found in the database of known fingerprints do not match exactly. In that case, a thresholding operation is carried out, to determine whether the two templates being matched are sufficiently similar. As indicated above, inexact matches may occur as a result of dirt or injuries to the fingers from which the fingerprints are taken, from rotation or distortion of the fingerprint image, or simply from poor quality fingerprints. A correlation coefficient is thus specified in the correlation between the templates being compared. If the correlation is above the correlation coefficient the templates are considered a match, otherwise a match is not reported. The value of the correlation coefficient may be varied depending on the application of the system. If the correlation coefficient is low, a greater incidence of false acceptance occurs, where an impostor is authenticated. A high correlation coefficient results in a greater incidence of false rejection, where an authorized individual is rejected. The required correlation coefficient thus may be adjusted to suit the specific application of the system.

The methods of verification and identification according to embodiments of the present invention provide for rapid comparison of fingerprints by using templates generated from minutiae of an input fingerprint image. The speed of comparison is important particularly in identification problems, because databases of known fingerprints may be very large. For example, law enforcement fingerprint databases may contain tens of millions of entries, and rapid identification of fingerprints may be vital. In the case of identity verification, speed is also important, since the individual whose identity is being verified may need rapid access to data or to a location.

Embodiments of the system according to the present invention are also capable of performing identification and verification tasks when the input fingerprint image is rotated relative to the reference fingerprint templates, or when the input image involves a partial fingerprint. Since the position of the minutiae generated by the system is defined in relation to other minutiae in the template, not to an external coordinate system, rotating the input image does not affect the accuracy of the template matching system. If the input fingerprint image is a partial image, a probabilistic approach may be used to obtain a match of the templates. For example, for different size templates, individual rows of the first template may be compared to every row of the second template until a match is found. If no match is found, every row of the second template may be compare to all the rows of the first one, again looking for a match.

Figure 5:
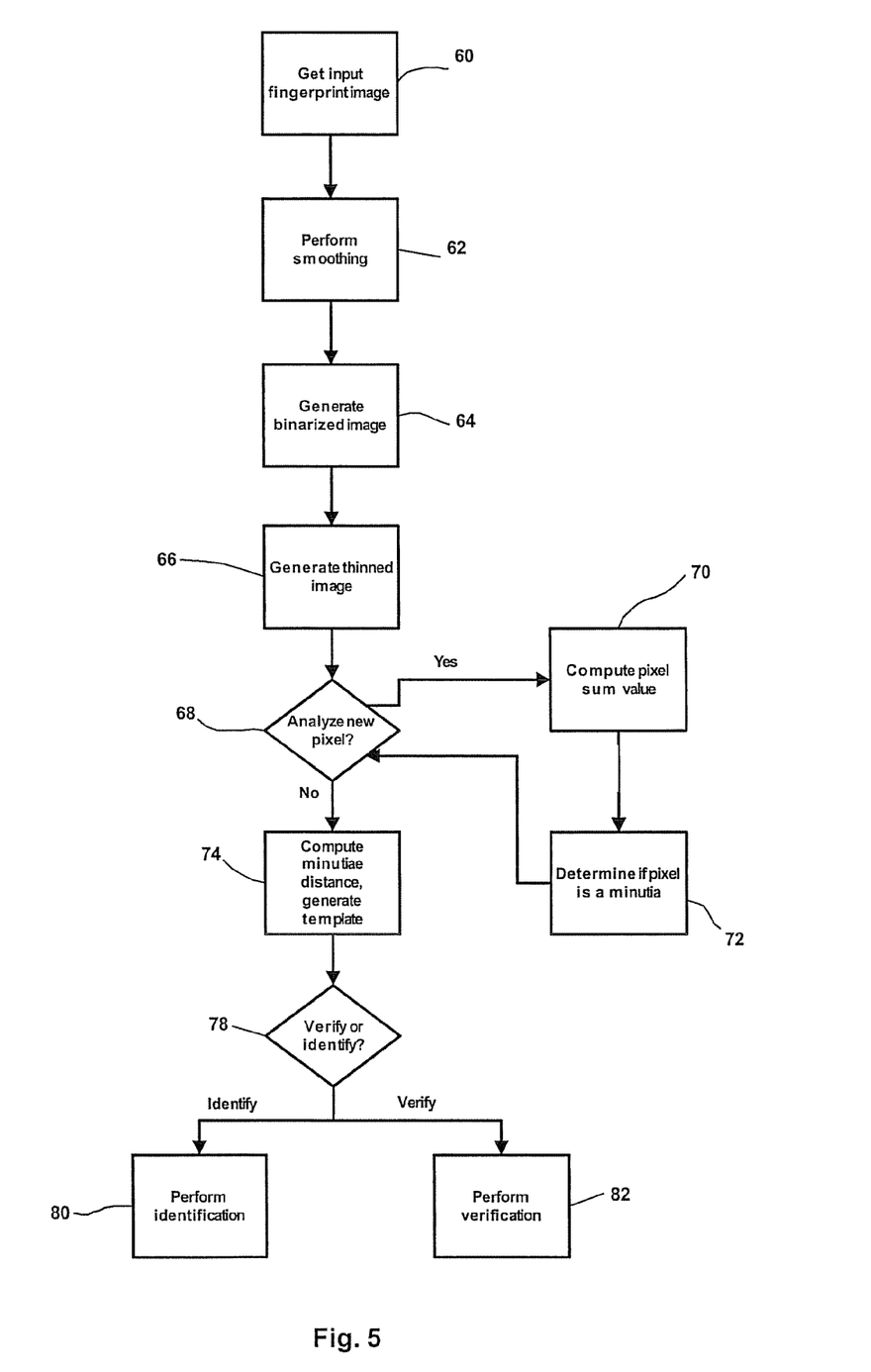
FIG. 5 is a flowchart describing the template generation and comparison method according to an embodiment of the present invention.

FIG. 5 describes the steps that may be taken, according to an embodiment of the present invention, to generate a template and to perform an identification or validation of the template. The process begins in step 60, where the input fingerprint image is provided to the system. If the image is not machine readable, it may be scanned, for example, and stored in a file readable by an electronic processor. The input fingerprint image is smoothed in step 62, to remove noise from the input fingerprint image. After the initial smoothing, the image is binarized in step 64, as described above, to assign to each pixel of the image a pixel value of 0 or 1. For example, the value 1 may be assigned to pixels representing points on the fingerprint's crest lines, and the value 0 to all other pixels. In step 66 the binarized image is thinned, to normalize the width of all lines to one pixel.

A recursion loop starts in step 68, to analyze each pixel having a pixel value of 1. In step 70, a grid is formed around each of those pixels, extending one pixel away in all directions. This results in a grid with 8 cells around, the center cell. Moving along each of these cells, a change in pixel value from 0 to 1 is noted, and every time such change occurs, a transition sum value is increased by one. After all cells have been checked, the transition sum value is noted in step 72, and if it is at least equal to a selected value, the pixel in the center cell is marked as a minutia. The minutiae are thus logged in step 72 for future processing.

Once all the pixels representing minutiae are known, a template may be generated in step 74 to record the minutiae and their location relative to other minutiae. For example, the template may consist of database entries correlating each minutia, its distance vector from each of the other minutiae, and gradient information relative to the minutiae. The template may be stored in step 76 as a database in an electronic storage media which may be used by an electronic processor.

In step 78 a decision is made whether the newly generated template is to be used in a verification or an identification step. In a verification step 82, the template is compared to a selected stored template derived from known fingerprints, to validate the identity of the person from whom the template was generated. In identification step 80 the template is compared to all templates stored in the database, to determine the identity of the unknown individual from whom the input fingerprints were obtained.

The present invention has been described with reference to specific embodiments. However, other embodiments may be devised that do not depart from the scope of the invention. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method for fingerprint recognition, comprising:
   binarizing a fingerprint image to produce a binary image with an electronic processor;
   superimposing a mask over portions of the binary image with a software module;
   averaging a first coordinate of pixels along line segments within the mask with the software module, the second coordinate of each line segment remaining constant;
   sequencing averaged first coordinate values for the line segments with the software module; and
   generating a template describing minutiae within the binary image with the software module.

2. The method of claim 1, further comprising smoothing the fingerprint image to remove noise.

3. The method of claim 1, further comprising assigning colors to ridges and furrows of the fingerprint image.

4. The method of claim 1, further comprising mapping one of furrows and ridges of the fingerprint image.

5. The method of claim 1, further comprising normalizing lines within the fingerprint image to a fixed width.

6. The method of claim 5, wherein normalizing the lines within the fingerprint image comprises redrawing the lines.

7. The method of claim 1, wherein binarizing a fingerprint image to produce a binary image comprises assigning a pixel value of zero to light pixels and a pixel value of one to pixels representing dark pixels.

8. The method of claim 7, further comprising defining a threshold value to distinguish between light and dark pixels.

9. The method of claim 7, further comprising computing a transition sum between neighboring pixels.

10. The method of claim 1, further comprising:
   retrieving at least one reference template from an electronic storage media;
   comparing the generated template to the at least one reference template; and
   determining if one or more reference templates match the generated template.

11. The method of claim 10, further comprising:
   defining a correlation coefficient for the generated template and the at least one reference template;
   computing correlation values between the generated template and the at least one reference template; and
   comparing computed correlation values with the correlation coefficient.

12. The method of claim 10, determining if one or more reference templates match the generated template comprises comparing one or more rows of the generated template with one or more rows of the reference templates.

13. The method of claim 1, further comprising:
   isolating minutiae within the binary image;
   determining position information for each of the minutiae; and
   storing the position information in a database.

14. The method of claim 13, wherein isolating minutiae within the binary image comprises locating bifurcation minutiae within the binary image.

15. A system for analyzing fingerprints, comprising:
   a software module that superimposes a mask over a binary image, averages a first coordinate of pixels along line segments within the mask, each of the line segments having a constant second coordinate value, generates a sequence of averaged first coordinate values for the line segments, and generates a template identifying minutiae in the binary image; and
   an non-transitory electronic storage media that stores minutiae location information.

16. The system of claim 15, wherein the non-transitory electronic storage media further retrieves at least one reference template from a database, compares the generated template with the at least one reference template, and identifies the generated template.

17. The system of claim 16, wherein the software module compares individual rows of the generated template with every row of the at least one reference template.

18. The system of claim 15, wherein the software module defines a threshold value to distinguish between light and dark pixels and determines transition sum values between neighboring pixels.

19. The system of claim 15, wherein the software module detects minutiae from the sequence of averaged first coordinate values.

20. A system for analyzing fingerprints, comprising:
   means for superimposing a mask over areas of a binary image;
   means for averaging a first coordinate of pixels along line segments within the mask;
   means for generating a sequence of averaged first coordinate values for the line segments; and
   means for generating a template identifying minutiae in the binary image.

* * * * *

UNITED STATES PATENT AND TRADEMARK OFFICE
CERTIFICATE OF CORRECTION

| | | |
|---|---|---|
| PATENT NO. | : 7,853,054 B2 | Page 1 of 1 |
| APPLICATION NO. | : 11/461490 | |
| DATED | : December 14, 2010 | |
| INVENTOR(S) | : Biswas et al. | |

It is certified that error appears in the above-identified patent and that said Letters Patent is hereby corrected as shown below:

In Column 4, Line 22, delete "the are" and insert -- them are --, therefor.

In Column 5, Lines 53-57, delete "In the.....sequence." and insert the same after the equation at Line 50, as a continuation of the paragraph.

In Column 8, Line 9, delete "around," and insert -- around --, therefor.

Signed and Sealed this
Fourteenth Day of August, 2012

David J. Kappos
*Director of the United States Patent and Trademark Office*